United States Patent
Sinha et al.

(10) Patent No.: US 7,577,424 B2
(45) Date of Patent: Aug. 18, 2009

(54) SYSTEMS AND METHODS FOR WIRELESS VULNERABILITY ANALYSIS

(75) Inventors: Amit Sinha, Marlborough, MA (US); Nicholas John Darrow, Alpharetta, GA (US)

(73) Assignee: Airdefense, Inc., Alpharetta, GA (US)

( * ) Notice: Subject to any disclaimer, the term of this patent is extended or adjusted under 35 U.S.C. 154(b) by 577 days.

(21) Appl. No.: 11/312,042

(22) Filed: Dec. 19, 2005

(65) Prior Publication Data

US 2007/0142030 A1     Jun. 21, 2007

(51) Int. Cl.
- H04M 1/66 (2006.01)
- H04M 3/00 (2006.01)
- H04W 24/00 (2006.01)
- H04B 17/00 (2006.01)
- G06F 11/00 (2006.01)

(52) U.S. Cl. .................. 455/410; 455/423; 455/67.14; 726/25; 379/189

(58) Field of Classification Search ............... 455/410, 455/423, 67.14; 726/25; 379/189
See application file for complete search history.

(56) References Cited

U.S. PATENT DOCUMENTS

| | | | |
|---|---|---|---|
| 5,077,753 A | 12/1991 | Grau, Jr. et al. | |
| 5,231,634 A | 7/1993 | Giles et al. | |
| 5,237,614 A | 8/1993 | Weiss | |
| 5,339,316 A | 8/1994 | Diepstraten | |
| 5,393,965 A | 2/1995 | Bravman et al. | |
| 5,487,069 A | 1/1996 | O'Sullivan et al. | |
| 5,577,209 A | 11/1996 | Boyle et al. | |
| 5,646,389 A | 7/1997 | Bravman et al. | |
| 5,666,662 A | 9/1997 | Shibuya | |
| 5,737,328 A | 4/1998 | Norman et al. | |
| 5,745,479 A | 4/1998 | Burns et al. | |
| 5,745,483 A | 4/1998 | Nakagawa et al. | |
| 5,768,312 A | 6/1998 | Imamura | |
| 5,781,857 A | 7/1998 | Hwang et al. | |
| 5,787,077 A | 7/1998 | Kuehnel et al. | |
| 5,796,942 A | 8/1998 | Esbensen | |
| 5,809,060 A | 9/1998 | Cafarella et al. | |
| 5,825,817 A | 10/1998 | Tamaka et al. | |

(Continued)

FOREIGN PATENT DOCUMENTS

WO     WO 98/59428     12/1998

(Continued)

OTHER PUBLICATIONS

*IBM unlocks wireless security services*, it world.com (Date Alleged: Oct. 9, 2001) http://www.itworld.com/Net/2629/IDGO11009IBMsecurity (Accessed from Google's cache: Apr. 10, 2003.

(Continued)

*Primary Examiner*—Nick Corsaro
*Assistant Examiner*—Shannon R Brooks
(74) *Attorney, Agent, or Firm*—Clements Bernard PLLC; Lawrence A. Baratta, Jr.; Christopher L. Bernard

(57) ABSTRACT

Security vulnerability assessment for wireless networks is provided. Systems and methods for security vulnerability assessment simulate an attack upon the wireless network, capture the response from the wireless network, and identify a vulnerability associated with the wireless network after analyzing the response from the wireless network.

26 Claims, 6 Drawing Sheets

U.S. PATENT DOCUMENTS

| | | | |
|---|---|---|---|
| 5,844,900 | A | 12/1998 | Hong et al. |
| 5,866,888 | A | 2/1999 | Bravman et al. |
| 5,870,666 | A | 2/1999 | Tanaka et al. |
| 5,875,179 | A | 2/1999 | Tikalsky |
| 5,896,499 | A | 4/1999 | McKelvey |
| 5,903,848 | A | 5/1999 | Takahashi |
| 5,913,174 | A | 6/1999 | Casarez et al. |
| 5,919,258 | A | 7/1999 | Kayashima et al. |
| 5,940,591 | A | 8/1999 | Boyle et al. |
| 5,953,652 | A | 9/1999 | Amin et al. |
| 5,987,609 | A | 11/1999 | Hasebe |
| 6,006,090 | A | 12/1999 | Coleman et al. |
| 6,058,482 | A | 5/2000 | Liu |
| 6,067,297 | A | 5/2000 | Beach |
| 6,070,244 | A | 5/2000 | Orchier et al. |
| 6,104,712 | A | 8/2000 | Robert et al. |
| 6,119,230 | A | 9/2000 | Carter |
| 6,141,778 | A | 10/2000 | Kane et al. |
| 6,145,083 | A | 11/2000 | Shaffer et al. |
| 6,151,357 | A | 11/2000 | Jawahar et al. |
| 6,158,010 | A | 12/2000 | Moriconi et al. |
| 6,178,512 | B1 | 1/2001 | Fifield |
| 6,185,689 | B1 | 2/2001 | Todd, Sr. et al. |
| 6,188,681 | B1 | 2/2001 | Vesuna |
| 6,202,157 | B1 | 3/2001 | Brownlie et al. |
| 6,272,129 | B1 | 8/2001 | Dynarski et al. |
| 6,272,172 | B1 | 8/2001 | Deshpande et al. |
| 6,282,546 | B1 | 8/2001 | Gleichauf et al. |
| 6,289,214 | B1 | 9/2001 | Backstrom |
| 6,292,508 | B1 | 9/2001 | Hong et al. |
| 6,301,668 | B1 | 10/2001 | Gleichauf et al. |
| 6,301,699 | B1 | 10/2001 | Hollander et al. |
| 6,304,973 | B1 | 10/2001 | Williams |
| 6,317,829 | B1 | 11/2001 | Van Oorschot |
| 6,320,948 | B1 | 11/2001 | Heilmann et al. |
| 6,324,647 | B1 | 11/2001 | Bowman-Amuah |
| 6,324,656 | B1 | 11/2001 | Gleichauf et al. |
| 6,330,244 | B1 | 12/2001 | Swartz et al. |
| 6,363,477 | B1 | 3/2002 | Fletcher et al. |
| 6,400,752 | B1 | 6/2002 | Suzuki et al. |
| 6,404,772 | B1 | 6/2002 | Beach et al. |
| 6,411,608 | B2 | 6/2002 | Sharony |
| 6,453,159 | B1 | 9/2002 | Lewis |
| 6,453,345 | B2 | 9/2002 | Trcka et al. |
| 6,466,608 | B1 | 10/2002 | Hong et al. |
| 6,470,384 | B1 | 10/2002 | O'Brien et al. |
| 6,473,449 | B1 | 10/2002 | Cafarella et al. |
| 6,477,198 | B1 | 11/2002 | Gumm |
| 6,484,029 | B2 | 11/2002 | Hughes et al. |
| 6,487,666 | B1 | 11/2002 | Shanklin et al. |
| 6,499,107 | B1 | 12/2002 | Gleichauf et al. |
| 6,501,951 | B2 | 12/2002 | Moore |
| 6,507,864 | B1 | 1/2003 | Klein et al. |
| 6,522,689 | B1 | 2/2003 | Heinrich |
| 6,539,207 | B1 | 3/2003 | del Castillo et al. |
| 6,539,428 | B2 | 3/2003 | Davies |
| 6,674,403 | B2 | 1/2004 | Gray et al. |
| 6,697,337 | B1 | 2/2004 | Cafarelli et al. |
| 6,799,047 | B1 | 9/2004 | Bahl et al. |
| 6,874,089 | B2 | 3/2005 | Dick et al. |
| 6,910,135 | B1 | 6/2005 | Grainger |
| 6,934,298 | B2 | 8/2005 | Bentley |
| 2001/0027107 | A1 | 10/2001 | Shinozaki et al. |
| 2001/0030956 | A1 | 10/2001 | Chillariga et al. |
| 2001/0038626 | A1 | 11/2001 | Dynarski et al. |
| 2001/0039579 | A1 | 11/2001 | Trcka et al. |
| 2002/0021745 | A1 | 2/2002 | Negus |
| 2002/0029288 | A1 | 3/2002 | Dobbins et al. |
| 2002/0032871 | A1 | 3/2002 | Malan et al. |
| 2002/0035699 | A1 | 3/2002 | Crosbie |
| 2002/0044533 | A1 | 4/2002 | Bahl et al. |
| 2002/0059434 | A1 | 5/2002 | Karaoguz et al. |
| 2002/0060994 | A1 | 5/2002 | Kovacs et al. |
| 2002/0060995 | A1 | 5/2002 | Cervello et al. |
| 2002/0061031 | A1 | 5/2002 | Sugar et al. |
| 2002/0066034 | A1 | 5/2002 | Schlossberg et al. |
| 2002/0072329 | A1 | 6/2002 | Bandeira et al. |
| 2002/0083343 | A1 | 6/2002 | Crosbie et al. |
| 2002/0087882 | A1 | 7/2002 | Schneier et al. |
| 2002/0090089 | A1 | 7/2002 | Branigan et al. |
| 2002/0090952 | A1 | 7/2002 | Cantwell |
| 2002/0094777 | A1 | 7/2002 | Cannon et al. |
| 2002/0101837 | A1 | 8/2002 | Bender et al. |
| 2002/0112047 | A1 | 8/2002 | Kushwaha et al. |
| 2002/0112185 | A1 | 8/2002 | Hodges |
| 2002/0129138 | A1 | 9/2002 | Carter |
| 2002/0138755 | A1 | 9/2002 | Ko |
| 2002/0147920 | A1 | 10/2002 | Mauro |
| 2002/0160769 | A1 | 10/2002 | Gray |
| 2002/0161755 | A1 | 10/2002 | Moriarty |
| 2002/0174364 | A1 | 11/2002 | Nordman et al. |
| 2002/0176437 | A1 | 11/2002 | Busch et al. |
| 2002/0178383 | A1 | 11/2002 | Hrabik et al. |
| 2002/0181417 | A1 | 12/2002 | Malhotra et al. |
| 2003/0009696 | A1 | 1/2003 | Bunker V. et al. |
| 2003/0021254 | A1 | 1/2003 | Fukuda |
| 2003/0026198 | A1 | 2/2003 | Diepstraten et al. |
| 2003/0027550 | A1 | 2/2003 | Rockwell |
| 2003/0036404 | A1 | 2/2003 | Adachi et al. |
| 2003/0048770 | A1 | 3/2003 | Proctor, Jr. |
| 2003/0051163 | A1* | 3/2003 | Bidaud .................... 713/201 |
| 2003/0060207 | A1 | 3/2003 | Sugaya et al. |
| 2003/0061344 | A1 | 3/2003 | Monroe |
| 2003/0061506 | A1 | 3/2003 | Cooper et al. |
| 2003/0063592 | A1 | 4/2003 | Seki et al. |
| 2003/0064720 | A1 | 4/2003 | Valins et al. |
| 2003/0065934 | A1 | 4/2003 | Angelo et al. |
| 2003/0070084 | A1 | 4/2003 | Satomaa et al. |
| 2003/0084323 | A1 | 5/2003 | Gales |
| 2003/0088789 | A1 | 5/2003 | Fenton et al. |
| 2003/0095520 | A1 | 5/2003 | Aalbers et al. |
| 2003/0096577 | A1 | 5/2003 | Heinonen et al. |
| 2003/0096607 | A1 | 5/2003 | Taylor |
| 2003/0100308 | A1 | 5/2003 | Rusch |
| 2003/0105976 | A1 | 6/2003 | Copeland, III |
| 2003/0108016 | A1 | 6/2003 | Bonta |
| 2003/0110398 | A1 | 6/2003 | Dacier et al. |
| 2003/0117966 | A1 | 6/2003 | Chen |
| 2003/0117985 | A1 | 6/2003 | Fujii et al. |
| 2003/0117986 | A1 | 6/2003 | Thermond et al. |
| 2003/0119526 | A1 | 6/2003 | Edge |
| 2003/0120821 | A1 | 6/2003 | Thermond et al. |
| 2003/0123420 | A1 | 7/2003 | Sherlock |
| 2003/0125035 | A1 | 7/2003 | Khafizov et al. |
| 2003/0126258 | A1 | 7/2003 | Conkright et al. |
| 2003/0135762 | A1 | 7/2003 | Macaulay |
| 2003/0140246 | A1 | 7/2003 | Kammer et al. |
| 2003/0149888 | A1 | 8/2003 | Yadav |
| 2003/0161341 | A1 | 8/2003 | Wu et al. |
| 2003/0174680 | A1 | 9/2003 | Kuan et al. |
| 2003/0185244 | A1 | 10/2003 | Wu et al. |
| 2003/0189908 | A1 | 10/2003 | Kuan et al. |
| 2003/0192055 | A1 | 10/2003 | Aoki et al. |
| 2003/0196115 | A1 | 10/2003 | Karp |
| 2003/0200455 | A1 | 10/2003 | Wu |
| 2003/0217289 | A1 | 11/2003 | Ammon et al. |
| 2003/0221006 | A1 | 11/2003 | Kuan et al. |
| 2003/0224797 | A1 | 12/2003 | Kuan et al. |
| 2004/0003285 | A1 | 1/2004 | Whelan et al. |
| 2004/0068668 | A1 | 4/2004 | Lor et al. |
| 2004/0078598 | A1 | 4/2004 | Barber et al. |
| 2004/0102192 | A1 | 5/2004 | Serceki |
| 2004/0103307 | A1 | 5/2004 | Raphaeli et al. |
| 2004/0107219 | A1 | 6/2004 | Rosenberger |

| | | | |
|---|---|---|---|
| 2004/0136318 | A1 | 7/2004 | Bentley |
| 2004/0162995 | A1 | 8/2004 | Muaddi et al. |
| 2005/0193430 | A1* | 9/2005 | Cohen et al. ............. 726/25 |
| 2006/0193299 | A1* | 8/2006 | Winget et al. .............. 370/338 |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |
| WO | WO 03/085544 A1 | 10/2003 |
| WO | WO 03/088547 A2 | 10/2003 |
| WO | WO 03/088687 | 10/2003 |

OTHER PUBLICATIONS

*IBM Research's Wireless Security Auditor One-Step Ahead of Hackers*, mobileinfo.com, Issue 2001-30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM Debuts First Self-Diagnostic Wireless Security Tool on Linux*, lwn.net, (Date Alleged: Jun. 17, 2002) http://www.lwn.net/Articles/2661 (Accessed: Apr. 10, 2003).

Losi, Stephanie, *IBM Steps Up Wireless Security*, Newsfactor Network (Date Alleged: Oct. 8, 2001) http://www.newsfactor.com/perl/story/14012.html (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

Schwartz, Ephraim, *IBM Offers a Peek at Self-Healing PCS: Autonomic computing initiative will lead to self-configuring desktops and notebooks and greater wireless security*. (Date Alleged: Nov. 19, 2002) http://www.pcworld.com/resource/printable/article/0,aid,107069.asp (Accessed from Google's cache: Apr. 10, 2003).

*IBM initiative addressed wireless security*, M2 PRESWIRE (Date alleged: Oct. 9, 2001) http://www.lexis.com/research (Accessed: Apr. 10, 2003).

Manecksha, Ferina, *IBM to focus on "Think" strategy*, News Straits Times-Management Times (Date Alleged: Jan. 30, 2003) http://www.lexis.com/research (Accessed: Apr. 10, 2003).

Schwartz, Ephraim, *IBM unveils autonomic computing on notebooks, desktops*, Inforworld Daily News (Date Alleged: Nov. 19, 2002) http://www.lexis.com/research (Accessed: Apr. 10, 2003).

Toomgum, Sirvish, *"Think" Big Blue*, Nation, Worldsources, Inc. (Date Alleged: Nov. 19, 2002) http://www.lexis.com/research (Accessed: Apr. 10, 2003.

Morochove, Richard, *Why Dell lets competitors do the heavy lifting*, Toronto Star (Date Alleged: Nov. 11, 2002), http://www.lexis.com/research (Accessed: Apr. 10, 2003).

*Wireless Security Auditor* (*WSA*), IBM Security Research http://www.research.ibm.com/gsal/wsa/ (Accessed: Apr. 10, 2003).

*Distributed Wireless Security Auditor*, IBM Research http://www.research.ibm.com/gsal/dwsa/ (Accessed: Apr. 10, 2003).

*WhereLAN Location Sensor Locating Access Point*, Wherenet U.S.A. (2002).

Article entitled "A Short Tutorial on Wireless LANs and IEEE 802.11" by Lough et al., printed on May 27, 2002 in *The IEEE Computer Society's Student Newsletter*, Summer 1997, vol. 5, No. 2.

* cited by examiner

SYSTEMS AND METHODS FOR WIRELESS VULNERABILITY ANALYSIS

BACKGROUND AND SUMMARY

This disclosure relates to wireless network security systems and methods, and more particularly to systems and methods for analyzing vulnerabilities of wireless networks.

Wireless Local Area Networks (WLANs) offer a quick and effective extension of a wired network or standard local area network (LAN). Over the last few years, some deployments of WLANs have conformed to the Institute of Electrical and Electronics Engineers (IEEE) 802.11b standard that operates over the unregulated 2.4 GHz frequency spectrum. However, it should be understood that other standards, such as 802.11a, 802.11g, and supporting standards such as 802.1X, are being developed to handle increased speeds and enhanced functionality. The various 802.11 standards developed by the IEEE are available for download via URL: http://standards.ieee.org/getieee802/802.11.html; each of which are hereby incorporated by reference.

The mobility of air-bound, wireless networks creates security concerns where threats can come from any direction and are not limited to the wired infrastructure. Established security practices of guarding a few entry points to the network are no longer effective. Because wireless communication is broadcast over radio waves, wireless hackers who merely listen to the airwaves can pick up unencrypted messages. Additionally, messages encrypted with the Wired Equivalent Privacy (WEP) security protocol can be decrypted with a little time and available hacking tools. These passive intruders put businesses at risk of exposing sensitive information to corporate espionage.

The theft of an authorized user's identity also poses a threat. Service Set Identifiers (SSIDs) that act as crude passwords and Media Access Control (MAC) addresses that act as personal identification numbers are often used to verify that clients are authorized to connect with an access point. However, as noted above existing encryption standards are not infallible and allow intruders to pick up approved SSIDs and MAC addresses to connect to a WLAN, posing as an authorized user with the ability to steal bandwidth, and corrupt or download files that may contain sensitive information. Moreover, incorrectly configured access points can provide a hole in WLAN security. Many access points are initially configured to broadcast unencrypted SSIDs of authorized users. While SSIDs are intended to be passwords to verify authorized users, intruders can easily steal an unencrypted SSID to assume the identity of an authorized user.

Further, outsiders who cannot gain access to a WLAN can none-the-less pose security threats by jamming or flooding the airwaves with static noise that causes WLAN signals to collide and produce CRC errors. These Denial-of-Service (DoS) attacks effectively shut down the wireless network in a similar way that DoS attacks affect wired networks.

Careless and deceitful actions by both loyal and disgruntled employees also present security risks and performance issues to wireless networks with unauthorized access points, improper security measures, and network abuses. Because a simple WLAN can be easily installed by attaching a $80 access point to a wired network and a $30 WLAN card to a laptop, employees are deploying unauthorized WLANs or peer-to-peer wireless connections 175 when IT departments are slow to adopt the new technology.

The present disclosure is directed to systems and methods for performing vulnerability analysis in a wireless network. Systems and methods for identifying security vulnerabilities in a wireless network can include a system data store and a control engine. The data store can be configured to store the wireless attack patterns, network default data, and responses received from the wireless network in response to the simulated wireless attacks. The control engine can include a number of processing elements, and is in communication with the system data store. The control engine is further configured to perform steps including: performing simulated wireless attacks on the wireless network by communicating with at least one wireless device on the wireless network; receiving a response to the simulated wireless attack from the wireless network; analyzing the response of the wireless network to the simulated wireless attacks to identify a vulnerability of the wireless network; and, determining which of the wireless attack is most probable to occur based on the analyzed vulnerability, such that steps may be taken to mitigate the analyzed vulnerability.

An example of systems and methods for identifying security vulnerabilities in a wireless network can include the steps of: initiating a simulated attack on the wireless network; scanning wireless devices coupled to the wireless network for responses; analyzing the responses of the wireless devices to the attack; identifying a vulnerability of the wireless network based upon the analysis; and, adapting the wireless devices to mitigate the vulnerability based upon the responses.

DETAILED DESCRIPTION

Figure 1:
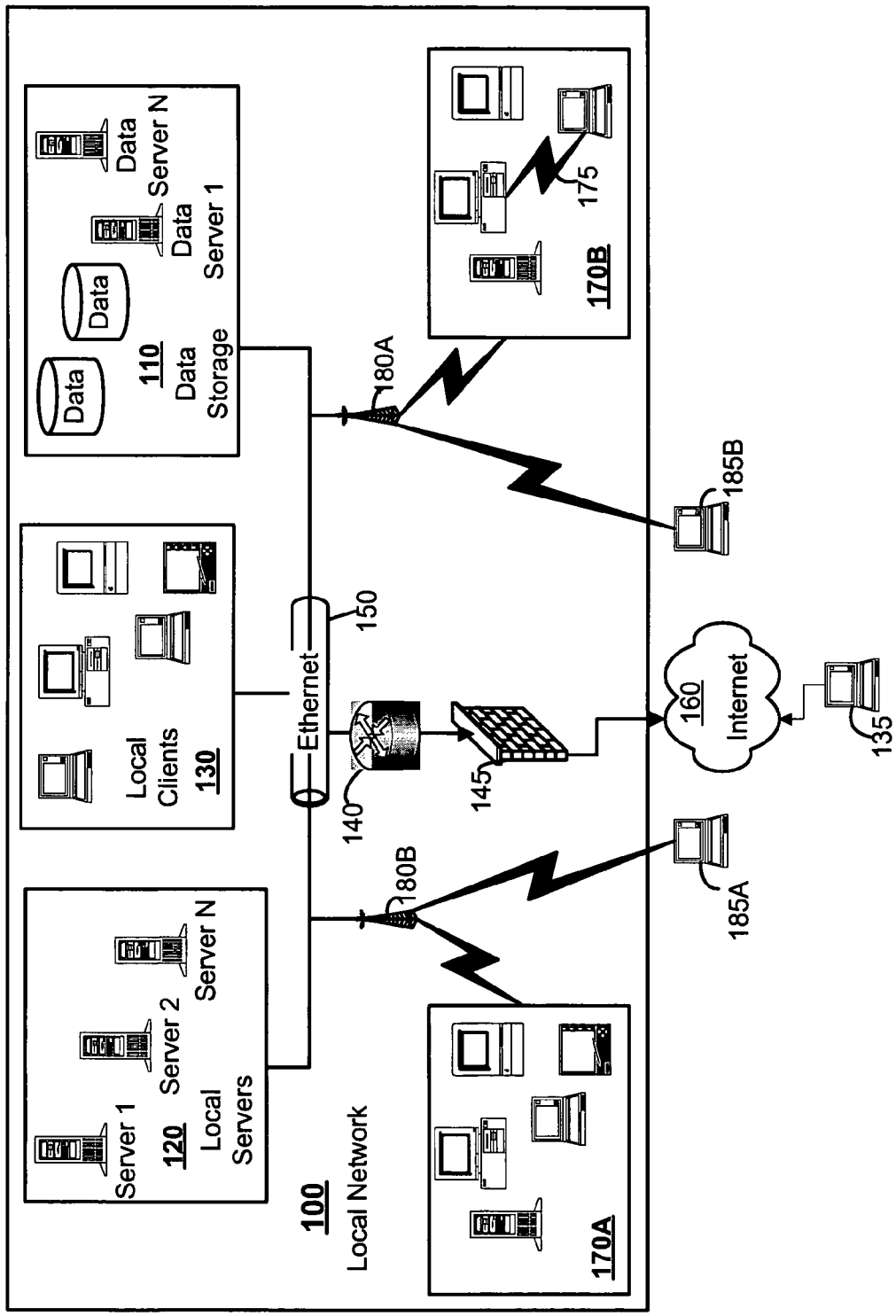
FIG. 1 is a diagram depicting a Local Area Network (LAN) upon which a vulnerability analysis system may operate.

FIG. 1 depicts a local area network (LAN) 100 upon which a vulnerability analysis system and method may operate. The LAN includes both wired and wireless components. The wired component depicted in FIG. 1A include a variety of connected systems such as local servers 120, local clients 130 and network accessible data storage components 110. By installing access points 180A, 180B to the wired network (e.g., Ethernet 150 and router 140), personal computers and laptops equipped with WLAN cards create a wireless network 170A, 170B which can connect to the wired network at broadband speeds.

It should be understood that firewalls 145 can be used to protect the wired local networks and act as security gates to prevent unauthorized traffic coming from the Internet such as a potential hacker 135. A firewall 145 may effectively deter an attack from a wired hacker 135 via the Internet 160. However, wireless hackers 185A, 185B can enter the LAN 100 through access points 180A, 180B. It should be further understood that these access points 180A, 180B are behind the firewall 145. Therefore, wireless networks 170A, 170B (in conjunction with access points 180A, 180B) can provide opportunities for unauthorized users to attack a network, which can include in various examples: a local area network, a wide area network, a metropolitan area network, a corporate Internet, among many others.

Figure 2:
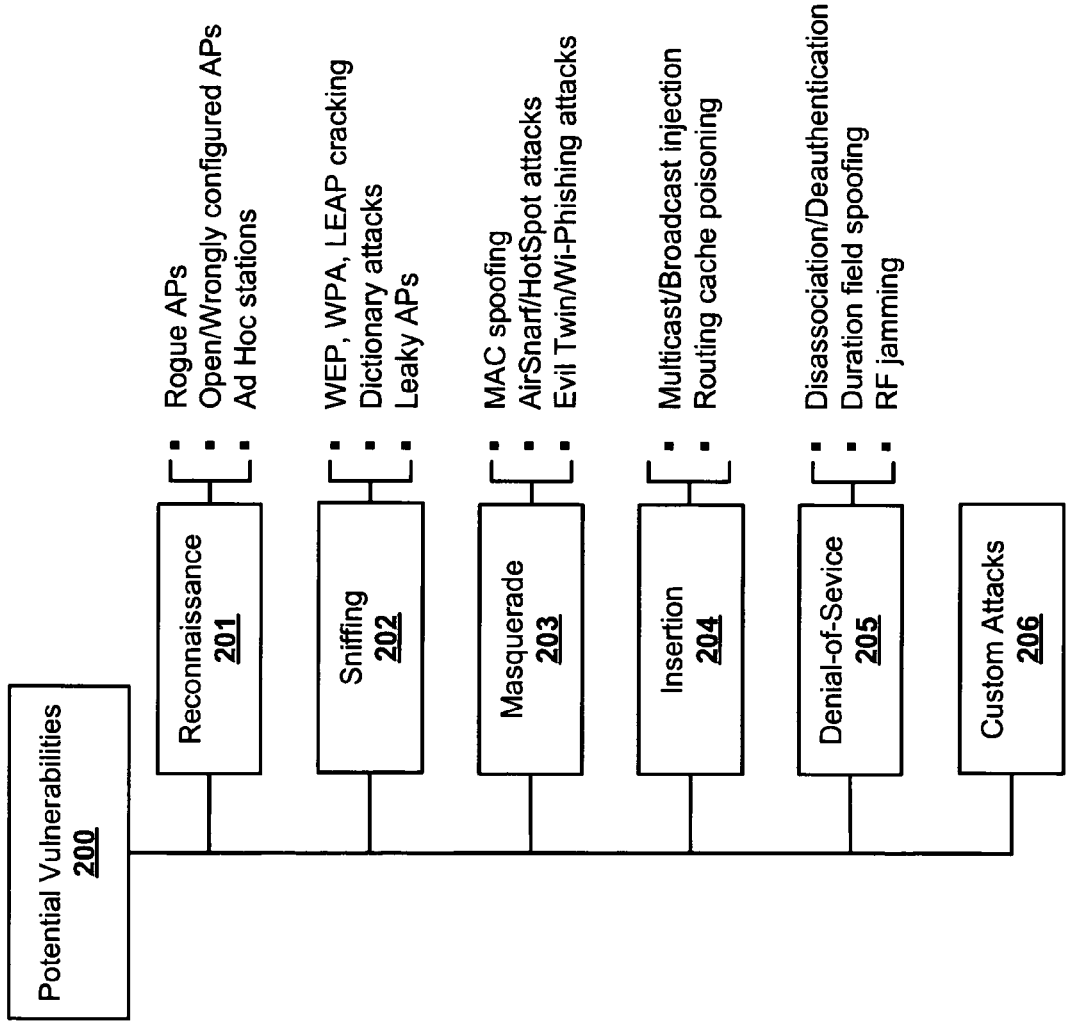
FIG. 2 is a list illustrating a variety of potential vulnerabilities to wireless networks that may be assessed by a vulnerability analysis system.

FIG. 2 illustrates a number of potential vulnerabilities 200 to wireless networks that may be analyzed by vulnerability analysis (VA) systems and methods. The potential vulnerabilities 200 comprise attacks to a wireless network and may be categorized as reconnaissance 201 attacks, sniffing 202 attacks, masquerade 203 attacks, insertion 204 attacks, Denial-of-Service (DOS) 205 attacks, and custom attacks 206. A hacker may use one or more of the potential vulnerabilities 200 as a stand alone attack or in a combination attack.

The reconnaissance 201 attack can exploit broadcasts from WLAN access points (APs) and client stations to identify wireless networks. WLAN APs and client stations broadcast their presence by transmitting a variety of signals. For example, APs send out beacon frames and relay information such as a timestamp, a Service Set ID (SSID), supported transmission rates, and power save information, among others. Client stations, for example, may actively send out probe requests to gather information from other 802.11 wireless devices available for association. Reconnaissance 201 tools are available to exploit these broadcasts such as, for example, NetStumbler available as freeware from NetStumbler.com, and Kismet available from www.kismetwireless.net. NetStumbler is a Windows-based tool configured to probe the airwaves searching for APs that broadcast their SSIDs, providing easy ways for hackers to find open wireless networks. Kismet is a Linux tool which passively monitors and captures wireless traffic. Both NetStumbler and Kismet use Global Positioning System (GPS) information to map the exact locations of WLANs. The reconnaissance 201 attacks may exploit rogue APs (e.g., unauthorized AP connected to a LAN), open or wrongly configured APs (e.g., authorized APs which are open to access by anyone or which are not configured properly for wireless security), and ad hoc stations (e.g., wireless connections between computers without APs).

The sniffing 202 attacks include capturing WLAN data broadcasted over a wireless channel. WLAN data is visible to any device on the same wireless channel and within range of the transmitting device. The collected WLAN data can be used to view clear text communications or to break encryption keys. Hacking tools such as Effetech, a Windows-based HTTP protocol packet sniffer available from EffeTech, Inc., can be used to reassemble files sent over clear text wireless links. Additionally, hackers may use tools such as WEPCrack and AirSnort, both are open source UNIX tools available from sourceforge.net a subsidiary of OSTG, Inc. of Fremont, CA, to break the wired equivalent privacy (WEP) encryption standard. These tools exploit vulnerabilities in the WEP encryption algorithm by passively observing wireless LAN traffic until they collect enough data to recognize the pattern to break the encryption key. Examples of the sniffing 202 attacks may comprise WEP, wi-fi protected access (WPA), and lightweight extensible authentication protocol (LEAP) cracking; dictionary attacks; and Leaky APs.

The masquerade 203 attacks comprise the theft of an authorized user's identity. Even though SSIDs and media access control (MAC) addresses act as personal identification numbers (PINs) for verifying the identity of authorized clients, existing encryption standards are not infallible. Knowledgeable hackers can pick off authorized SSIDs and MAC addresses and steal bandwidth, corrupt or download files from a connected network. A hacker can deceive an unsuspecting user station into connecting to a spoofed 802.11 network, or alter the configuration of the station to operate in an ad-hoc networking mode. The hacker can then steal information, install trojan horses or other spyware, and if it is connected to the wired network, use the victim's station as a launch pad to get access to other servers. Stations can be tricked or forced to connect to a malicious access point, since there is often no authentication of the access point. This is an open systems interconnect (OSI) model layer 2 vulnerability. Layer 3 authentication offers no protection against it, nor does the use of virtual private networks (VPNs). Wireless LANs with 802.1x based authentications (at OSI layer 2) do help protect against malicious associations, but are vulnerable. A malicious association attack does not attempt to break the VPN or other security measures. Instead, such an attack assumes control of the client at layer 2. A rising trend of masquerade attacks involves "evil twins" and wi-phishing. An evil twin is an AP offering a wireless connection to the Internet pretending to be a trusted wireless network. Wi-Phishing is the act of covertly setting up a wireless-enabled laptop or access point (such as an evil twin) but for the sole purpose of getting wireless laptops to associate and track keystrokes, allowing the hacker to capture passwords and credit card information.

The insertion 204 attack comprises an exploitation of improperly configured WLANs or rouge AP's to target an entire network. When an access point is attached to an unfiltered part of the network, it broadcasts network traffic, such as spanning tree (802.1D), open shortest path first (OSPF), routing information protocol (RIP), hot standby router protocol (HSRP) and other broadcast or multicast traffic. By doing this, the packets invite attacks against wireless and wired network equipment, and spur a collapse of the network including hubs, routers, and switches. A hacker can inject traffic onto the wireless LAN segment and it will be propagated through the network. Spanning tree attacks usually render intelligent hubs, bridges, routers, and switches inoperative, such that the devices should be rebooted or reconfigured to make them functional. Routing cache poisoning attacks are another enterprise type of attack. A hacker can use tools such as IRPAS or Routing Attack Tool, UNIX based tools available from Phenoelit.de, to inject bogus routing updates into the network, changing the default gateways or destroying routing tables. Tools such as WepWedgie, an open source UNIX tool available from sourceforge.net, reduce the time needed to crack long WEP keys from days to hours by using a traffic injection technique to create large amounts of traffic for key recovery.

The denial-of-service (DOS) 205 attack is configured to consume the network bandwidth or computation resources of a station in the network. The DOS 205 attack is directed against a station in the network to prevent that station from communication with the network, against an AP to prevent stations from connecting to it, or against a portion or the entirety of all network devices. In the case of a DOS 205 attack against all network devices, the attack renders WLAN inoperable.

Hackers continuously invent and deploy innovative methods of disrupting and breaking into WLANS. Potential vulnerabilities 200 may comprise custom attacks 206 that are constantly emerging. Such attacks may be periodically and/or routinely added to systems and methods for vulnerability assessment in accordance with the teachings herein.

Figure 3:
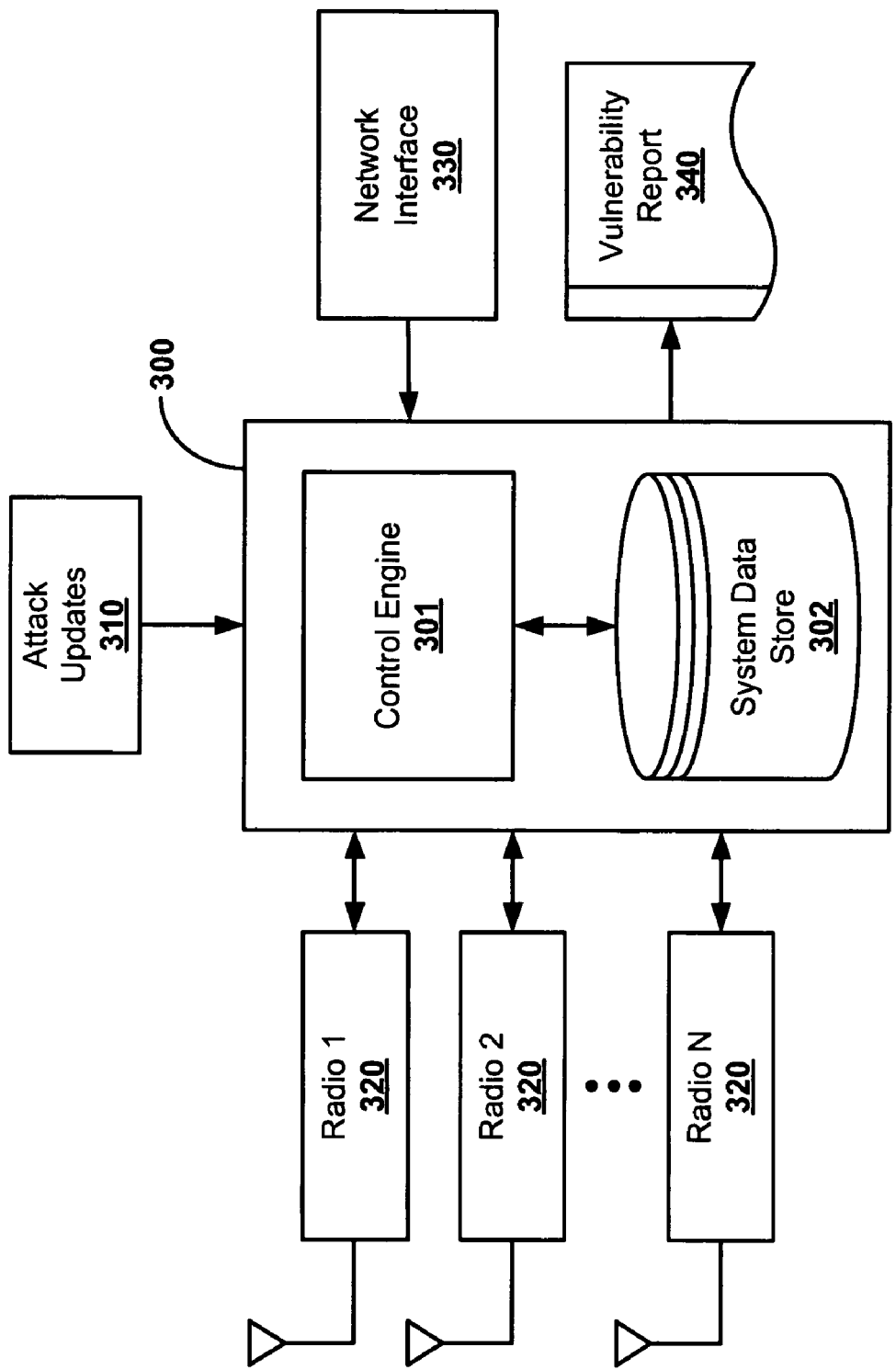
FIG. 3 is a block diagram depicting systems and methods for vulnerability analysis of wireless networks.

FIG. 3 is a block diagram depicting systems and methods for vulnerability analysis, including a vulnerability analysis (VA) system 300 for wireless networks. The VA system 300 can include a control engine 301 and a system data store 302. The VA system 300 can be further configured to have access and control over one or more wireless radios 320. The radios 320 may comprise an AP, a wireless client card, or other wireless devices. The VA system 300 connects to a network through a network interface 330 which can include a wired connection to the network, such as an Ethernet connection. The VA system 300 may receive attack updates 210 which may include custom attacks patterns 206 as depicted in FIG. 2 to periodically and/or routinely update the VA system 300 in response to emerging vulnerabilities. The VA system 300 may also be configured to generate a comprehensive vulnerability report 340 which may detail the potential vulnerabilities of the network in response to a vulnerability analysis, an analysis of the attacks and the responses of the devices in the network, and suggested preventative measures for improved security.

The control engine 301, for example, can be a processor, configured to mimic a hacker's behavior by proactively initiating different types of attacks and analyzing the responses of wireless radios 320 to the attacks. The attacks may comprise one or more of the potential vulnerabilities 200 to wireless networks as depicted in FIG. 2. The system data store 302 includes stored information. The control engine 301 is configured to use the system data store 302 to launch different attacks, to store information from the attacks, and to determine the next attack for which to test. The system data store 302 may also be updated with attack and vulnerability updates 310 as new attacks emerge. Network default data, which is information about authorized wireless devices, operating system version, installed applications, and patch levels, is obtained by the VA system 300 through the network interface 330. The network default data may also be obtained from the wireless network. The network interface 330 may automatically or manually update the authorized device list to the VA system 300. The VA system 300 may be configured to automatically analyze the wireless network based on a predetermined scan interval or based on a manual command.

The VA system 300 may comprise a stand-alone system or a distributed system. For example, the VA system 300 in a stand-alone system could include a single computer with a wireless card and software configured to perform the functions of the control engine 301 and memory to store the system data store 302. In another example, the VA system 300 may be a distributed system including multiple radios 320 at multiple locations connected by a network and one or more servers configured to perform the functions of the control engine 301 and one or more storage devices configured to store the system data store 302. Additionally, the control engine 301 and the system data store 302 may be in separate devices connected by a network.

Figure 4:
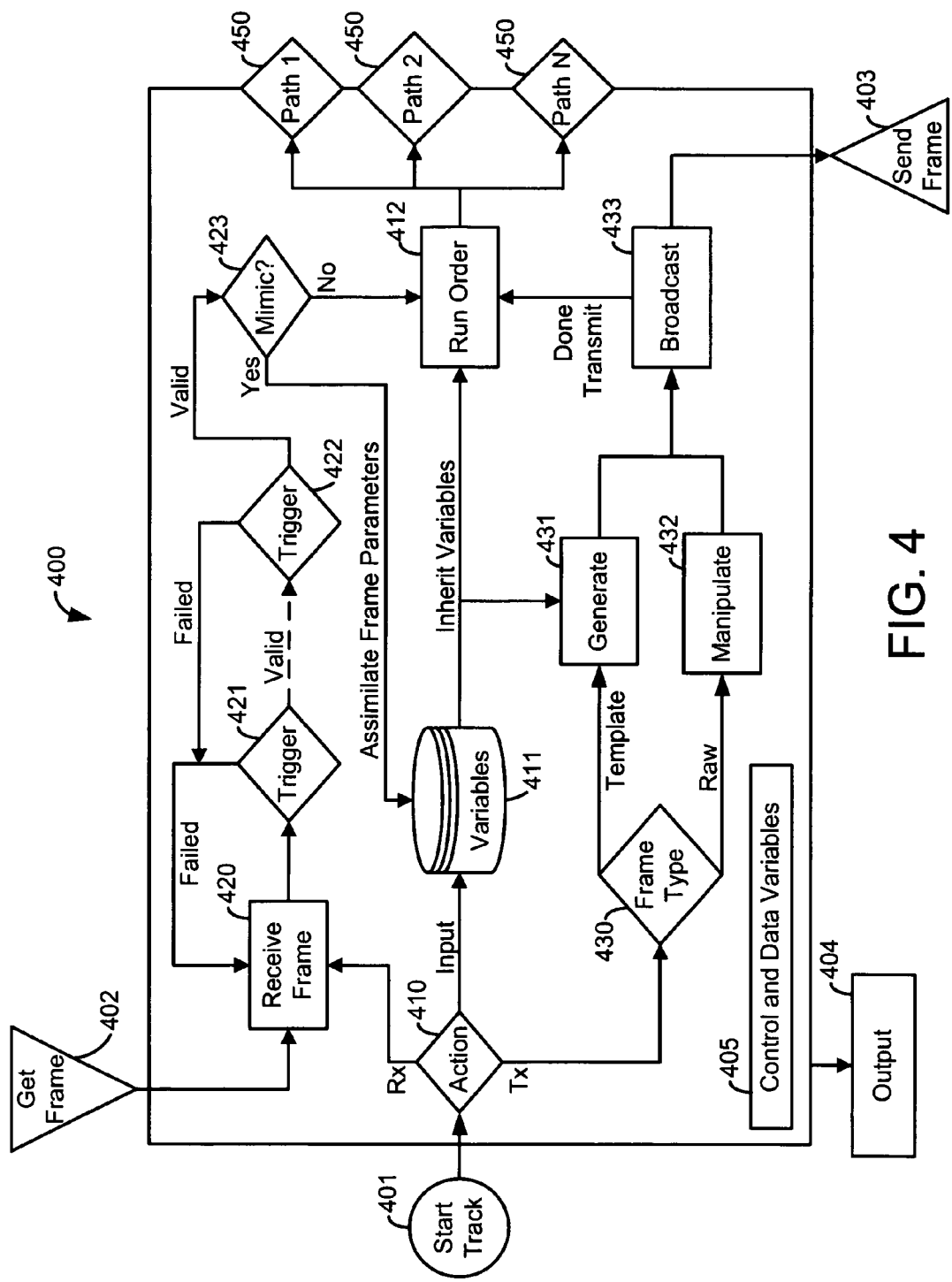
FIG. 4 is a flow chart illustrating an operational scenario of a track which describes a unit of a vulnerability analysis operation.

FIG. 4 is a flow chart illustrating an operational scenario of a track 400 that describes a unit of operation for vulnerability analysis systems and methods. The track 400 describes a single transmit or receive iteration in an attack, and several tracks 400 may operate together to form an attack as depicted in the example in FIG. 5. In step 401, the track 400 starts. Each track 400 can include control and data variables 405 such as track name and ID, timeout parameters, loop count variables, run order variables, among others. In step 410, the action indicated by the track 400 may include transmitting or receiving a frame.

In step 410, if the track 400 is receiving a frame, then the track 400 waits to receive a frame in step 420 until the track 400 gets a frame in step 402 from a radio. A set of triggers 420, 421 can be defined for a received frame. These triggers may test the frame for a particular condition. The triggers 421, 422 may further include conditions or filters set to look for patterns or matches in the received frame. For example, a first trigger 421 may be set to identify a beacon frame and a second trigger 422 may be set to identify a particular source MAC address. Additionally, it should be understood that the track 400 may comprise more than two triggers 421, 422 or only a single trigger 421 depending on the type of track. Examples of triggers 421, 422 may comprise frame type, wireless channel, transmission rate, frame ID, source MAC address, destination MAC address, SSID, etc. If the any of the triggers 421, 422 fail, then the track 400 goes back to step 420 to receive the next frame. If all the triggers 421, 422 are valid, then the track 400 may mimic the frame parameters (e.g., MAC address, SSID, etc.), as depicted in step 423. If the track 400 mimics the frame parameters, then the parameters may be assimilated into a variables database 411 and the track 400 passes control to the run order in step 412. Even though the triggers 421, 422 are valid, the track 400 may not assimilate the variables by passing control in step 412 to the run order.

In step 410, if the track 400 is transmitting a frame, then in step 430 the track 400 decides the type of frame. In step 431, the track 400 may generate a template frame. Template frames can be generated using variables 411. The variables 411 may comprise information such as data from previous track iterations including, for example, MAC addresses, SSIDs, etc. In step 432, the track 400 may manipulate a raw frame which may be, for example, a generic beacon frame. In step 433, either a generated template frame or a manipulated raw frame is broadcasted. In step 403, the frame from step 433 is sent to a radio (e.g., AP, wireless client card, etc.). After the broadcast in step 433, the track 400 passes control to the run order in step 412.

The run order in step 412 determines which path 450 the track 400 will take based on the outcome of the track 400. The paths 450 may include a track 400 with different control and data variables 405, a loop back to the same track 400, or termination. The run order in step 412 may define paths 450 based on present or dynamic conditions, and subsequent tracks 400 may inherit variables 411 from previous tracks 400. Each track 400 can be configured to output data as shown in step 404. This data, in some examples, can include the control and data variables 405, the variables 411, and the outcome variables from the track 400.

An example of a track 400 may comprise finding an AP which is hiding its SSID. First, the track 400 waits to receive a frame in step 420 until it gets a frame as shown in step 402. The first trigger 421 is set to determine if the frame is beacon. If the received frame is a beacon, the track 400 passes to the second trigger 422, else the track 400 returns to step 420 to wait for the next frame to be received. The second trigger 422 looks for an SSID value. If the received frame has an SSID value, then the track 400 may mimic the SSID value in step 423 and assimilate it in the variables 411. If the received frame has a null SSID value, then the track 400 returns to step 420 to wait for the next frame to be received.

Figure 5:
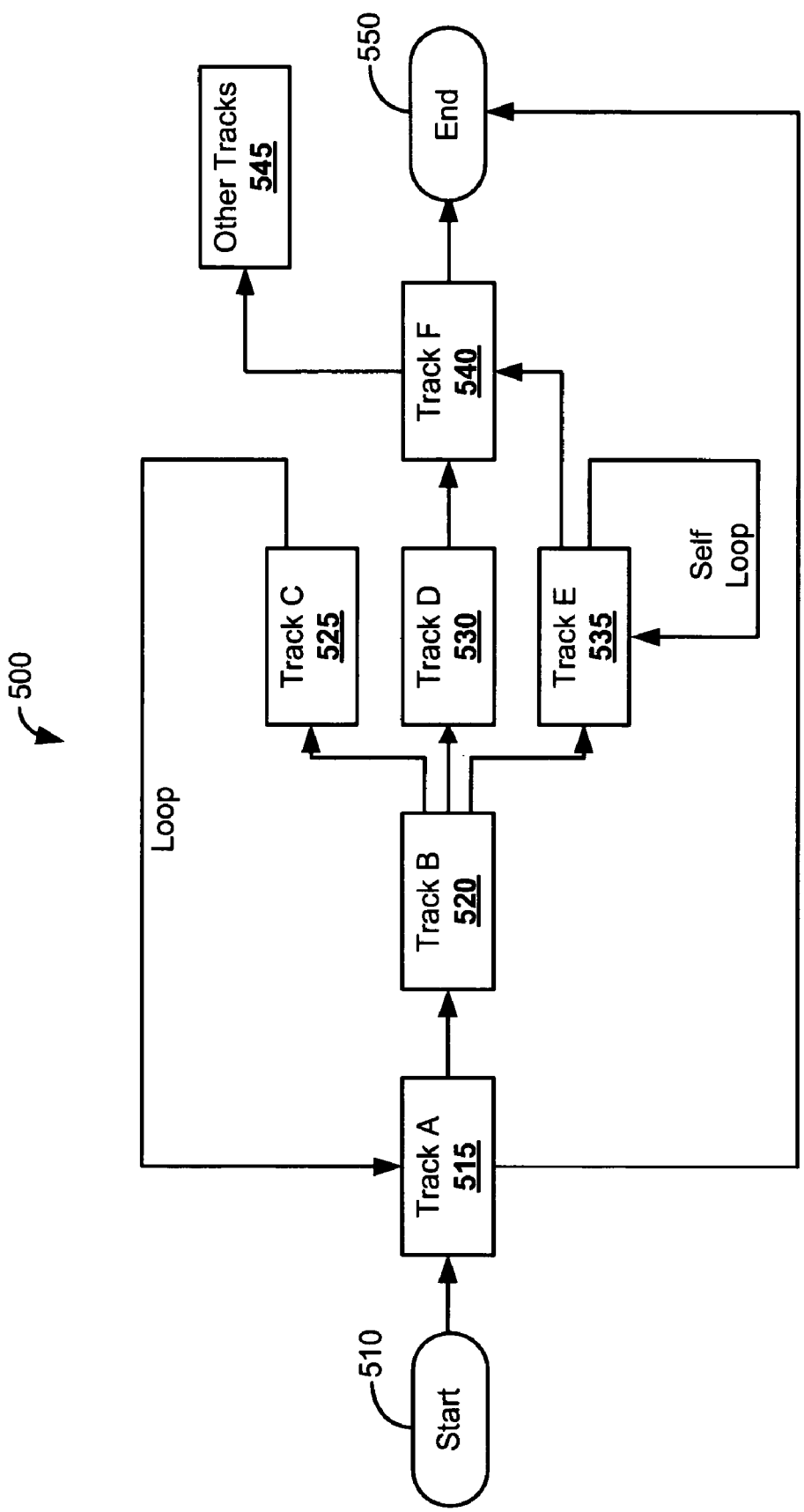
FIG. 5 is a flowchart illustrating an operational scenario of an attack which comprises multiple tracks.

FIG. 5 is a flowchart illustrating an operational scenario depicting an example of a simulated wireless attack 500 which includes multiple tracks. Tracks may include a timeout value which passes control over to the next track if nothing happens. The tracks may further include run order variables within the track to define which path the track takes if triggers are matched in the track. Additionally, a subsequent track, in some examples, may inherit variables from the previous track. Tracks may loop to previous tracks and may also self-loop back. The potential vulnerabilities are each defined as a series of tracks in a sequence such as the example in FIG. 5. However, it should be understood that some tracks and attacks may be performed in parallel, in accordance with this disclosure. The system data store comprises a listing of each potential vulnerability and the associated sequence of tracks to execute the vulnerability.

An attack 500 starts as shown in step 510 by passing control to a track A 515. Track A 515 may transmit or receive a frame and then depending on conditions may terminate as shown in step 550 or may pass control to a track B 520. Track B 520 may transmit or receive a frame and then upon conditions may pass control to track C 525, track D 530, track E 535, or combinations thereof. Track C 525 may loop back to track A 515 upon execution. Track D 530 may pass control to track F 540. Track E 535 may self-loop back to itself or pass control to track F 540. Track F 540 may terminate as shown in step 520 or may pass control to other tracks 545.

Figure 6:
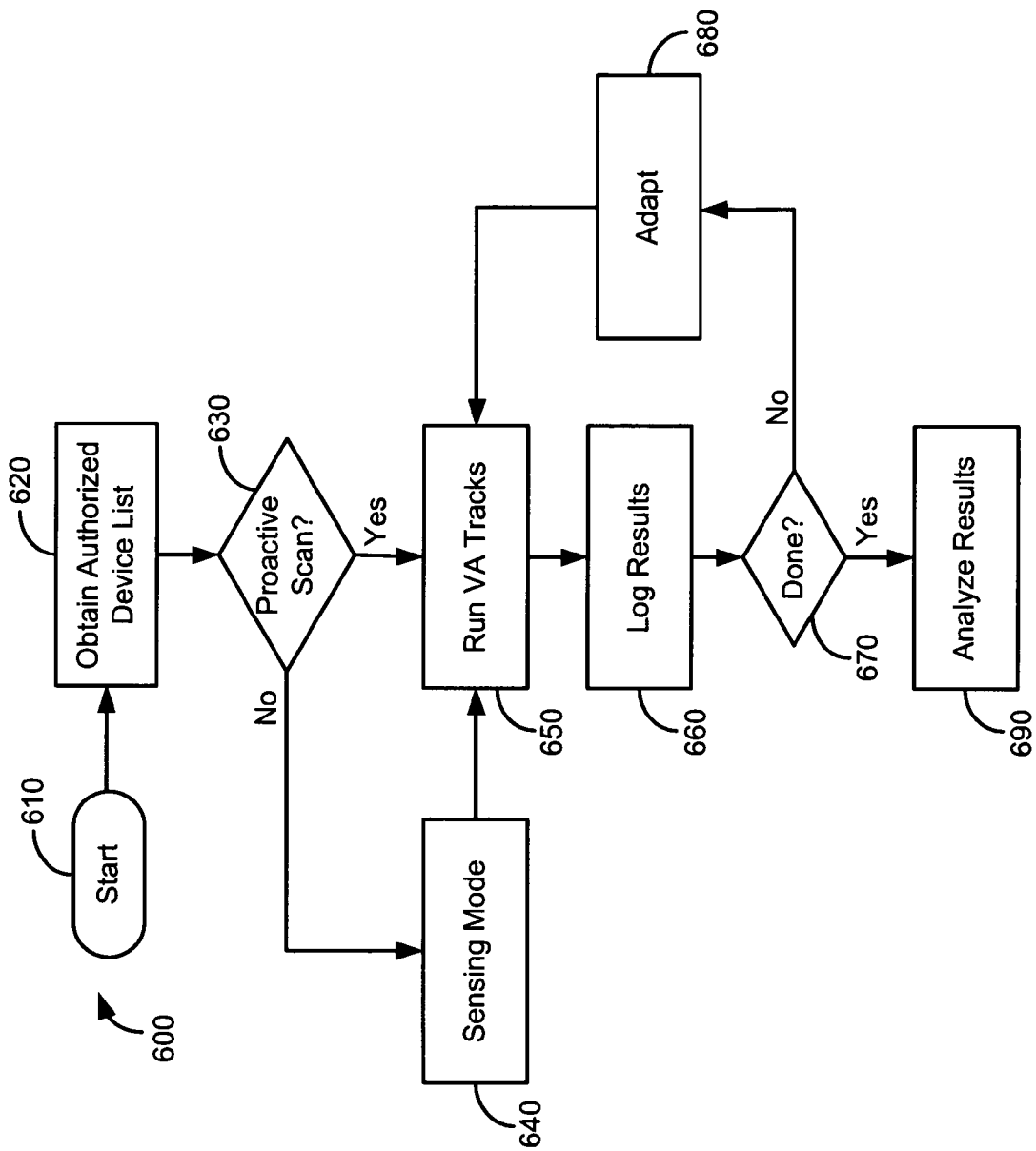
FIG. 6 is a flowchart illustrating an operational scenario of the execution of a vulnerability analysis system.

FIG. 6 is a flowchart 600 illustrating an operational scenario for example systems and methods providing vulnerability analysis for a wireless network. In step 610, the vulnerability analysis is started. The operational scenario may operate to continuously offer proactive vulnerability analysis or it may started manually to perform single operations. In step 620, the operational scenario obtains an authorized device list which is a component of network default data. This list may be obtained automatically through a network interface to the wired network or it may be obtained manually. In step 630, the operational scenario is set to either proactively scan the wireless network or to manually sense the wireless network. In step 640, the operational scenario senses the wireless network by not actively performing analysis until it is manually prompted to go to step 650. In the proactive sensing mode and when manually prompted to, the operational scenario runs VA tracks as shown in step 650. VA tracks comprise a sequence of multiple tracks such as, for example, depicted in FIGS. 4 and 5. The operational scenario includes a system data store of the tracks associated with each potential vulnerability to a wireless network. The potential vulnerabilities include a number of wireless attack patterns gathered through observing current attack techniques used by hackers and other malicious users. In step 660, the results of the VA tracks are logged. In step 670, the operational scenario determines whether the vulnerability analysis is complete based on the outcome of the tracks in step 650 and predetermined variables. In step 680, the operational scenario can modify settings associated with the wireless devices included in the wireless network based upon the outcome of the tracks in 650. These settings can be modified so as to mitigate the potential vulnerability of the wireless network via the wireless device (s). The operational scenario can further include repeating the vulnerability assessment by rerunning the tracks after modifying the settings of the wireless device(s). Such modification may include adjusting network parameters such as WEP and other wireless security measures. In step 690, the operational scenario is complete and can provide an analysis of the results.

What is claimed is:

1. A system for identifying security vulnerabilities in a wireless network, the system comprising:
   a system data store configured to store a plurality of wireless attack patterns, network default data associated with the wireless network, and responses received from the wireless network in response to simulated wireless attacks using one or more of the plurality of wireless attack patterns;
   a wireless radio in communication with the system data store; and
   a control engine comprising one or more processing elements, wherein the control engine is in communication with the system data store and the wireless radio, and wherein the control engine is configured to perform the steps comprising of:
   performing a sequence of wireless tracks comprising the simulated wireless attacks on the wireless network by communicating with at least one wireless device on the wireless network, wherein each wireless track of the sequence of wireless tracks comprises one of a wireless transmit track and a wireless receive track, and wherein each wireless track of the sequence of wireless tracks is performed responsive to previous wireless tracks in the sequence and with assimilated wireless frame parameters from previous wireless receive tracks;
   receiving a response to the simulated wireless attack from the wireless network;
   analyzing the response of the wireless network to the simulated wireless attacks to identify a vulnerability of the wireless network; and
   determining which of the wireless attacks is most probable to occur based on the analyzed vulnerability, such that steps may be taken to mitigate the analyzed vulnerability.

2. The system of claim 1, wherein the control engine is further configured to perform the step of providing a report of the security vulnerabilities in the wireless network.

3. The system of claim 1, wherein the control engine is further configured to perform the step of obtaining network default data from the wireless network and a wired network coupled to the wireless network, wherein the network default data comprises operating system version, installed applications, patch levels, wireless network configuration, and authorized devices.

4. The system of claim 1, wherein the control engine is further configured to perform the step of updating the system data store with the responses received from the wireless network in response to the simulated wireless attack.

5. The system of claim 1, wherein the plurality of wireless attack patterns used for the simulated attacks comprise at least one of:
   a reconnaissance attack comprising a wireless device gathering network information from the wireless network;
   a sniffing attack comprising gathering data transmitted on the wireless network;
   an injection attack comprising injection of data on the wireless network configured to generate excess traffic on the wireless network;
   a denial-of-service attack configured to prevent the operation of the wireless network; and
   combinations thereof.

6. The system of claim 5, wherein the plurality of wireless attack patterns comprise a custom attack pattern.

7. The system of claim 1, wherein the system comprises means to update the system data store with a custom attack pattern.

8. The system of claim 1, wherein each of the wireless tracks of the sequence of wireless tracks comprises a timeout value which passes control to a next wireless track in the sequence if nothing happens.

9. The system of claim 8, wherein a wireless receive track comprises the steps of:
   receiving data from at least one wireless radio on the wireless network;
   analyzing a wireless frame header from the received data;
   matching the wireless frame header to conditions;
   storing the data in the system data store if the conditions are satisfied; and
   determining a next wireless track responsive to the matching step.

10. The system of claim 9, wherein the step of matching the wireless frame header to conditions comprises matching at least one of frame type, channel ID, transmission rate, frame count, frame delay, frame ID, source MAC address, destination MAC address, BSSID MAC address, source/destination/BSSID MAC address, SSID, and timeout value.

11. The system of claim 8, wherein a wireless transmit track comprises the steps of:
determining a frame type to transmit, wherein the frame type comprises one of a raw frame and a template frame derived from the assimilated frame parameters; and
transmitting the frame type configured to generate a response from the wireless network.

12. The system of claim 11, wherein the template frame is determined based on the responses of the wireless network.

13. The system of claim 8, wherein a wireless transmit track comprises the step of transmitting raw generated data configured to generate a response from the wireless network.

14. The system of claim 1, wherein the wireless device comprises at least one of a wireless Access Point (AP) and a wireless client card; and wherein the control engine is further configured to perform the steps comprising of:
adjusting wireless settings responsive to the analyzed vulnerability.

15. The system of claim 1, wherein the system data store and the control engine comprise software embodied in system-readable storage.

16. The system of claim 15, wherein the software is configured to operate on a single computer comprising a wireless client card.

17. The system of claim 15, wherein the software is configured to operate on a distributed computer system and network.

18. The system of claim 17, wherein the distributed computer system comprise more than one of a server, a client, a laptop, a workstation, and an appliance.

19. The system of claim 18, wherein the network comprises a plurality of wireless devices and a plurality of wired devices.

20. A method for identifying security vulnerabilities in a wireless network, the method comprising the steps of:
initiating a simulated attack comprising a sequence of wireless tracks on the wireless network based upon stored wireless attack patterns, wherein each wireless track of the sequence of wireless tracks comprises one of a wireless transmit track and a wireless receive track, and wherein each wireless track of the sequence of wireless tracks is performed responsive to previous wireless tracks in the sequence and with assimilated wireless frame parameters from previous wireless receive tracks;
scanning a plurality of wireless devices coupled to the wireless network for responses from the plurality of wireless devices;
analyzing the responses of the wireless devices to the simulated attack;
identifying a security vulnerability based upon the analysis; and
adapting the wireless devices to mitigate the security vulnerability based upon the responses, wherein the adapting step comprises adjusting wireless settings of the wireless devices.

21. The method of claim 20, further comprising the step of providing a report of the security vulnerabilities in the wireless network to a system administrator.

22. The method of claim 20, further comprising the step of obtaining network default data from the wireless network and a wired network coupled to the wireless network, wherein the network default data comprises operating system version, installed applications, patch levels, wireless network configuration, and authorized devices.

23. The method of claim 20, further comprising the step of updating the simulated attack based on the responses of the wireless devices.

24. Computer readable media comprising instructions that upon execution by a processor cause the processor to perform the method of claim 20.

25. The method of claim 20, wherein the simulated attack is initiated automatically.

26. The method of claim 20, wherein the simulated attack is initiated manually.

* * * * *